United States Patent
Yoo et al.

(10) Patent No.: US 7,095,459 B2
(45) Date of Patent: Aug. 22, 2006

(54) ARRAY SUBSTRATE FOR LIQUID CRYSTAL DISPLAY AND METHOD FOR FABRICATING THE SAME

(75) Inventors: Hong Suk Yoo, Kyounggi-do (KR); Gyoo Chul Jo, Kyounggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/100,504

(22) Filed: Apr. 7, 2005

(65) Prior Publication Data

US 2005/0174501 A1    Aug. 11, 2005

Related U.S. Application Data

(62) Division of application No. 09/994,809, filed on Nov. 28, 2001, now Pat. No. 6,888,586.

(30) Foreign Application Priority Data

Jun. 5, 2001 (KR) ............ P 2001-31510
Jun. 5, 2001 (KR) ............ P 2001-31513

(51) Int. Cl.
  *G02F 1/136* (2006.01)
  *G02F 1/1343* (2006.01)
(52) U.S. Cl. .......... 349/42; 349/147; 257/59; 257/72
(58) Field of Classification Search ......... 349/42, 349/147; 257/59, 72
See application file for complete search history.

(56) References Cited

U.S. PATENT DOCUMENTS

| | | | |
|---|---|---|---|
| 5,671,027 A | * | 9/1997 | Sasano et al. ............ 349/46 |
| 5,943,105 A | * | 8/1999 | Fujikawa et al. ............ 349/39 |
| 6,218,221 B1 | | 4/2001 | Sah |
| 6,323,521 B1 | * | 11/2001 | Seo ............ 257/347 |
| 6,407,780 B1 | | 6/2002 | Sung |
| 6,414,730 B1 | | 7/2002 | Akamatsu et al. |
| 6,528,357 B1 | | 3/2003 | Dojo et al. |
| 2002/0130324 A1 | | 9/2002 | Song et al. |
| 2003/0067038 A1 | | 4/2003 | Fujikawa et al. |

FOREIGN PATENT DOCUMENTS

| | | |
|---|---|---|
| JP | 4-240824 | 8/1992 |
| JP | 11-259016 | 9/1999 |
| JP | 2000-199917 | 7/2000 |
| KR | 2000-0022732 | 4/2000 |
| KR | 2001-026625 | 4/2001 |

* cited by examiner

*Primary Examiner*—Huyen Ngo
(74) *Attorney, Agent, or Firm*—Morgan, Lewis & Bockius, LLP

(57) ABSTRACT

An array substrate for a liquid crystal display device includes a substrate; a drain electrode at an upper portion of the substrate, the drain electrode including, at least in part, two layers of conductive materials and having a first drain contact hole penetrating the two layers; a protective layer over the drain electrode, the protecting layer having a second drain contact hole communicating with the first drain contact hole; and a pixel electrode over the protective layer, the pixel electrode contacting the drain electrode at inner surfaces of the first drain contact hole formed in the drain electrode through the second drain contact hole.

10 Claims, 15 Drawing Sheets

ARRAY SUBSTRATE FOR LIQUID CRYSTAL DISPLAY AND METHOD FOR FABRICATING THE SAME

This application is a Divisional of U.S. patent application Ser. No. 09/994,809 filed Nov. 28, 2001 now U.S. Pat. No. 6,888,586 and claims the benefit of Korean Patent Applications Nos. P2000-31510 and P2000-31513, both filed in Korea on Jun. 5, 2001, which are hereby incorporated by reference.

BACKGROUND OF THE INVENTION

1. Field of the Invention

This invention relates to a liquid crystal display, and more particularly to an array substrate for a liquid crystal display and a fabricating method thereof.

2. Discussion of the Related Art

Generally, a liquid crystal display (LCD) controls a light transmittance using an electric field to display a picture. To this end, the LCD includes a liquid crystal panel having liquid crystal cells arranged in a matrix form, and a driving circuit for driving the liquid crystal panel. The liquid crystal panel is provided with pixel electrodes and a common electrode for applying electric fields to the respective liquid crystal cells. Typically, for each liquid crystal cell, the pixel electrode is provided on a lower substrate, whereas the common electrode is formed on the entire surface of an upper substrate. Each of the pixel electrodes is connected to a thin film transistor (TFT), which is used as a switching device. The pixel electrode, along with the common electrode, drives the liquid crystal cell in accordance with a data signal applied to the TFT.

Referring to FIGS. 1 and 2, an array substrate 1 of an LCD includes a TFT arranged at an intersection between a data line 13 and a gate line 11, a pixel electrode 23 connected to a drain electrode 7 of the TFT, a data pad portion DP connected to the data line 13, and a gate pad portion GP connected to the gate line 11.

The TFT includes a gate electrode 3 connected to the gate line 11, a source electrode 5 connected to the data line 13, and a drain electrode 7 connected, via a drain contact hole 19b, to the pixel electrode 23. Further, the TFT includes semiconductor layers 15 and 17, which define a channel between the source electrode 5 and the drain electrode 7 when a gate voltage is applied to the gate electrode 3. Such a TFT responds to a gate signal from the gate line 11 to selectively apply a data signal from the data line 13 to the pixel electrode 23.

The pixel electrode 23 is positioned at a cell area divided by the data line 13 and the gate line 11, and is made from a transparent conductive material having a high light transmittance. The pixel electrode 23 is electrically connected, via the drain contact hole 19b, to the drain electrode 7. The pixel electrode 23 generates a potential difference relative to a common transparent electrode (not shown) provided at an upper substrate (not shown) by a data signal applied via the TFT. By this potential difference, the liquid crystal molecules in the liquid crystal positioned between the array substrate 1 and the upper substrate are rotated due to its dielectric anisotropy. Due to this rotation, the liquid crystal allows selective transmission of light emitted from a light source through the pixel electrode 23 and the upper substrate.

The gate pad portion GP transmits a scanning signal, i.e., a gate pulse, which is generated from a gate driving integrated circuit (IC) (not shown), to the gate line 11. A gate pad terminal electrode 28 of the gate pad portion GP electrically contacts a gate pad 25 via a gate contact hole 19c.

The data pad portion DP transmits a data signal from a data driving IC (not shown) to the data line 13. A data pad terminal electrode 29 electrically contacts a data pad 27 via a data contact hole 19a.

Hereinafter, a method of fabricating the liquid crystal display device having the above-mentioned configuration will be described.

First, as shown in FIG. 3A, a gate metal layer is deposited on array substrate 1 of the LCD, and is patterned to form a gate pad 25 and a gate electrode 3. As shown in FIG. 3B, a gate insulating film 9 is formed on the entire surface of the array substrate 1, which has been provided with the gate pad 25 and the gate electrode 3. First and second semiconductor layers are deposited on the gate insulating film 9, and patterned to form an active layer 15 and an ohmic contact layer 17.

Subsequently, a data metal layer is deposited over the gate insulating film 9 and patterned to form a data pad 27, a source electrode 5 and a drain electrode 7, as shown in FIG. 3C. After the source electrode 5 and the drain electrode 7 are patterned, a portion of the ohmic contact layer 17 that is positioned over the gate electrode 3 is removed to expose the active layer 15. A portion of the active layer 15 corresponding to the gate electrode 3 between the source electrode 5 and the drain electrode 7 forms a channel.

Then, an insulating material is deposited over the gate insulating film 9 and patterned to form a protective layer 21, as shown in FIG. 3D. A data pad contact hole 19a and a drain contact hole 19b are formed in the protective layer 21 to expose the data pad 27 and the drain electrode 7, respectively. Also, a gate pad contact hole 19c is formed through the protective layer 21 and the gate insulating film 9 to expose the gate pad 25.

Subsequently, as shown in FIG. 3E, a transparent conductive material is deposited on the protective layer 21 and patterned to form a pixel electrode 23, a gate pad terminal electrode 28, and a data pad terminal electrode 29. The pixel electrode 23 electrically contacts the drain electrode 7 via the drain contact hole 19b. The gate pad terminal electrode 28 electrically contacts the gate pad 25 via the gate contact hole 19c, and the data pad terminal electrode 29 electrically contacts the data pad 27 via the data contact hole 19a.

The data pad 27, the source electrode 5 and the drain electrode 7 provided on the array substrate 1 of the LCD are formed of a single layer of chrome (Cr) or molybdenum (Mo), etc., and are collectively referred to as "data metal layer." As the trends of the LCD technology move towards finer device structures, a three-layer structure of first to third metal layers 6a, 6b and 6c (FIG. 4) has been proposed as the data metal layer. Here, the first and third metal layers 6a and 6c are made of a transparent conductive material and Mo, which is electrically stable, respectively, and the second metal layer 6b is made of aluminum (Al) or an aluminum alloy.

When such a three-layer structure of the data metal layer is patterned by a wet etching technique, the first and third metal layers 6a and 6c are likely to be ionized by an etchant liquid much more than the second metal layer 6b due to an electrode potential difference created between the first and third metal layers 6a and 6c and the second metal layer 6b. In other words, the first and third metal layers 6a and 6c are oxidized by the second metal layer 6b, and the second metal layer 6b is deoxidized by the first and third metal layers 6a and 6c. For this reason, the first and third metal layers 6a and 6c are more undercut than the second metal layer 6b, as illustrated in the circled magnified view designated by letter A in FIG. 4. When the protective layer 21 is deposited thereafter, the second metal layer 6b, which has a high reactivity, collapses. The collapsed second metal layer 6b becomes in contact with active layer 15, resulting in an increased leakage current of the TFT. Furthermore, since a deposition process of the data metal layer having such a three-layer structure requires three steps, the process is complex and incurs additional costs.

In order to overcome these problems, it has been proposed that the data metal layer be formed into a two-layer structure of first and second metal layers 6a' and 6b', as shown in FIG. 5. Here, the first metal layer 6a' is made of Al or an Al alloy while the second metal layer 6b' is made from Mo.

A method of fabricating the array substrate of the LCD having the data metal layer with such a two-layer structure includes the steps of substrate cleaning, substrate patterning, alignment film formation, annealing, substrate joining, liquid crystal injection and packaging processes. During these processes, a protective film patterning process, an annealing process, an alignment film process, and a seal-curing process are performed at temperatures greater than about 200° C. The second metal layer 6b' of the two-layer data metal layer collapses when it undergoes a heat treatment at about 200° C. or higher, thereby causing infiltration into the active layer 15, diffusion, spark phenomena, etc. In other words, the active layer 15 becomes in contact with the second metal layer 6b', resulting in characteristic deterioration and degradation of the TFT, such as presence of a large leakage current, etc.

In order to reduce such a leakage current, an attempt was made in that the data metal layer of two-layer structure is formed in such a sequence that the second metal layer 6b' is formed first and the first metal layer 6a' is formed subsequently. In this case, because the second metal layer 6b' (bottom layer) is made from Mo, a leakage current can be somewhat suppressed. However, there occurs a disadvantage of an increased contact resistance between the first metal layer 6a' made of aluminum and the transparent electrode formed subsequently.

SUMMARY OF THE INVENTION

Accordingly, the present invention is directed to an array substrate for a liquid crystal display and method for fabricating the same that substantially obviate one or more of the problems due to limitations and disadvantages of the related art.

An object of the present invention is to provide an array substrate for a liquid crystal display and a fabricating method thereof that are adaptive for reducing the contact resistance between a two-layer structured drain electrode and a pixel electrode and the contact resistance between a two-layer structured data pad and a data pad terminal electrode.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display according to one aspect of the present invention includes a drain electrode formed from different types of metal at the upper portion of the substrate; a first drain contact hole communicating with the drain electrode; a protective layer covering the drain electrode; a second drain contact hole opposite to the first drain contact hole through the protective layer; and a pixel electrode making an electrical side contact with the drain electrode through the first and second drain contact holes.

In the array substrate, the second drain contact hole may have a width lager than or substantially equal to the first drain contact hole.

The array substrate may further include a gate line provided at the substrate to receive a scanning signal; a data line crossing the data line to receive a data signal; a gate electrode connected to the gate line; a gate insulating film covering the gate line and the gate electrode; an active layer overlapping the gate electrode with the gate insulating film therebetween; an ohmic contact layer provided on the active layer and having a hole corresponding to a desired size of channel; and a source electrode connected to the data line and provided with the drain electrode and the desired size of channel.

The array substrate may further include a data pad formed from different types of metal at one end of the data line; a first data contact hole going through the data pad; a protective layer formed to cover the data pad; a second data contact hole opposite to the first data contact hole and going through the protective layer; and a data pad terminal electrode making an electrical side contact with the data pad through the first and second data contact holes.

In the array substrate, the second data contact hole may have a width lager than or substantially equal to the first data contact hole.

The different types of metal that can be used here include a first metal layer and a second metal layer. A first metal layer may be formed from any one of molybdenum (Mo), chrome (Cr), tantalum (Ta), tungsten (W) and titanium (Ti), and a second metal layer may be formed from aluminum (Al) or an aluminum alloy on the first metal layer.

The lower portion of the data pad may be provided with a gate insulating film formed on the substrate.

The array substrate may further include a semiconductor layer provided on the gate insulating film.

In the array substrate, the first metal layer for the data pad and the semiconductor layer may be formed into the same pattern. Further, the first metal layer for the drain electrode may be formed in the same pattern as the ohmic contact layer.

In another aspect, the present invention provides a method of fabricating an array substrate of a liquid crystal display device including the steps of forming a gate electrode and a gate line on the substrate; forming a gate insulating film on the substrate; forming a semiconductor layer on the gate insulating film; forming a data line, a source electrode and a drain electrode on the gate insulating film using different types of metals; forming the source electrode and the drain electrode and simultaneously forming a first drain contact hole going through the drain electrode; forming a protective layer on the gate insulating film; forming a second drain contact hole going through the protective layer in such a manner to be opposed to the first drain contact hole; and forming a pixel electrode making an electrical side contact with the drain electrode through the first and second drain contact holes.

In the method, the second drain contact hole may have a width lager than or substantially equal to the first drain contact hole.

The method may further include the steps of forming the data pad at one end of the data line using different types of metals; forming a first data contact hole going through the data pad simultaneously with said formation of the data pad; forming a protective layer on the gate insulating film; forming a second data contact hole going through the protective layer in such a manner to be opposed to the first data contact hole; and forming a data pad terminal electrode making an electrical side contact with the data pad through the first and second data contact holes.

In the method, the second data contact hole may have a width lager than or substantially equal to the first data contact hole.

The different types of metal that can be used here include a first metal layer and a second metal layer. A first metal layer may be formed from any one of molybdenum (Mo), chrome (Cr), tantalum (Ta), tungsten (W) and titanium (Ti), and a second metal layer may be formed from aluminum (Al) or an aluminum alloy on the first metal layer.

The method may further include the step of forming a gate insulating film between the substrate and the data pad. Also, the method may further include the step of forming a semiconductor layer on the gate insulating film.

The first metal layer for the data pad and the semiconductor layer may be formed into the same pattern. Also, the first metal layer for the drain electrode may be formed into the same pattern as an ohmic contact layer of the semiconductor layer.

In another aspect, the present invention provides an array substrate for a liquid crystal display device, including a substrate; a drain electrode at an upper portion of the substrate, the drain electrode including, at least in part, two layers of conductive materials and having a first drain contact hole penetrating the two layers, a protective layer over the drain electrode, the protecting layer having a second drain contact hole communicating with the first drain contact hole; and a pixel electrode over the protective layer, the pixel electrode contacting the drain electrode at inner surfaces of the first drain contact hole formed in the drain electrode through the second drain contact hole.

In a further aspect, the present invention provides a method of fabricating an array substrate for a liquid crystal display device, including the steps of forming a gate electrode and a gate line over a substrate; forming a gate insulating film over the substrate; forming a semiconductor layer over the gate insulating film; forming a data line, a source electrode, and a drain electrode over the gate insulating film, each of the data line, the source electrode, and the drain electrode including, at least in part, two layers of conductive materials, the step including removing portions of at least one of the two layers to pattern the drain electrode and, at the same time, define a first drain contact hole penetrating the two layers; forming a protective layer over the gate insulating film, the data line, the source electrode, and the drain electrode, the protective layer having a second drain contact hole communicating with the first drain contact hole; and forming a pixel electrode over the protective layer, the pixel electrode contacting the drain electrode at inner surfaces of the first drain contact hole formed in the drain electrode through the second drain contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

First Embodiment

Figure 1:
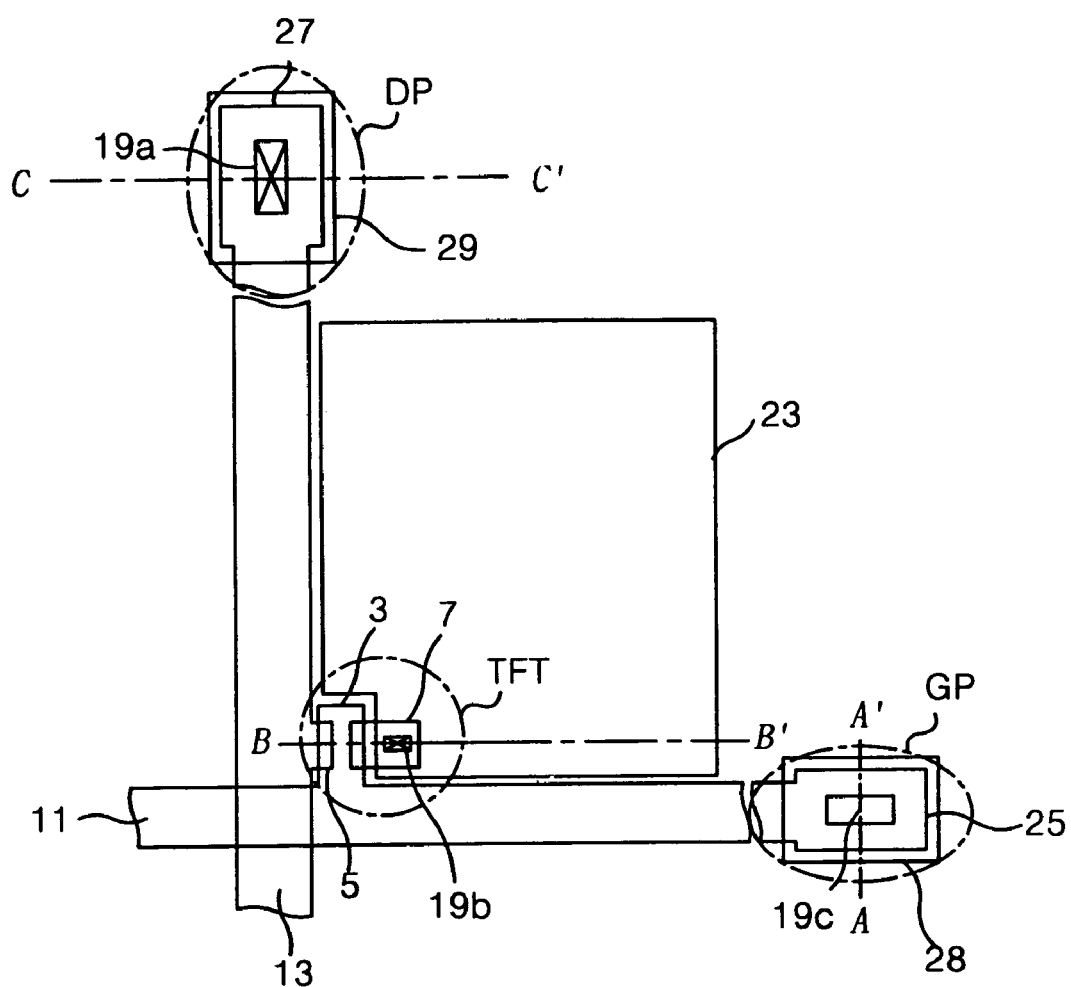
FIG. 1 is a plan view showing a structure of an array substrate of a conventional liquid crystal display device.
Figure 2:
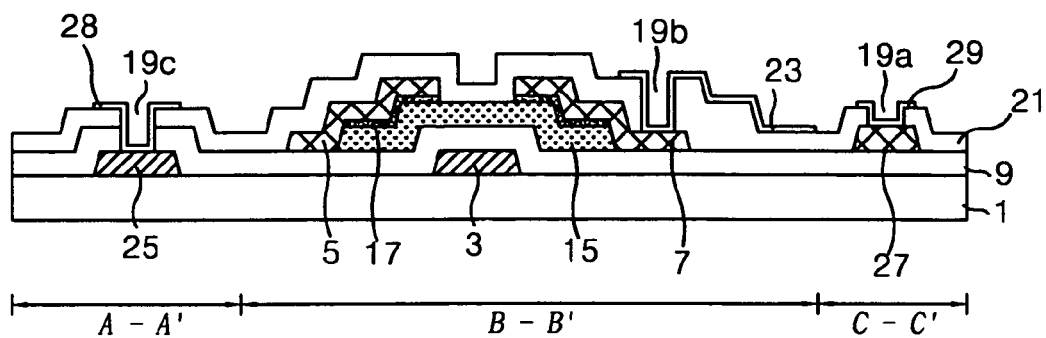
FIG. 2 is a section view of the array substrate of the liquid crystal display device taken along the lines A–A', B–B' and C–C' of FIG. 1.
Figure 3A:
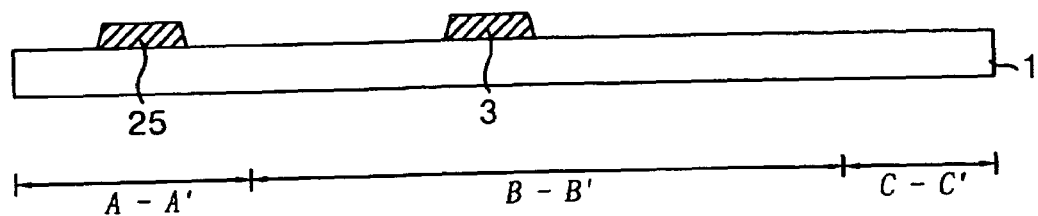
FIGS. 3A to 3E are section views illustrating a process of fabricating the array substrate of the liquid crystal display device of FIG. 2.
Figure 3B:
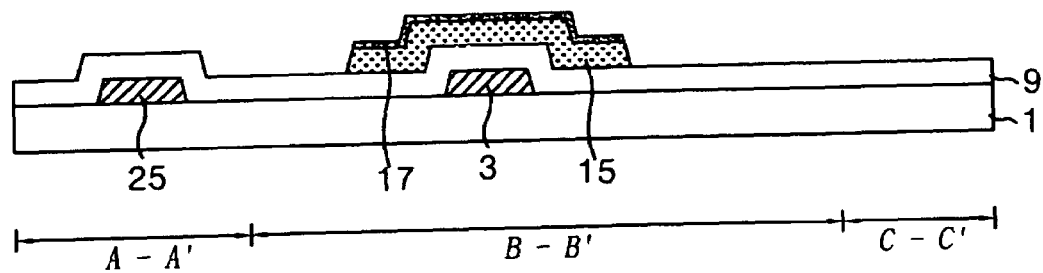
Figure 3C:
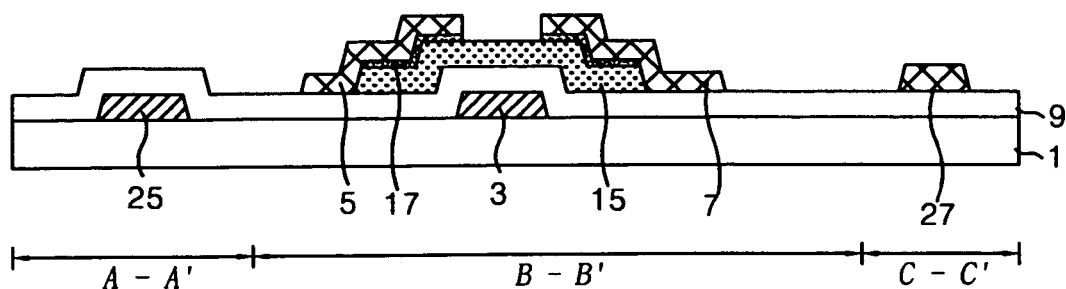
Figure 3D:
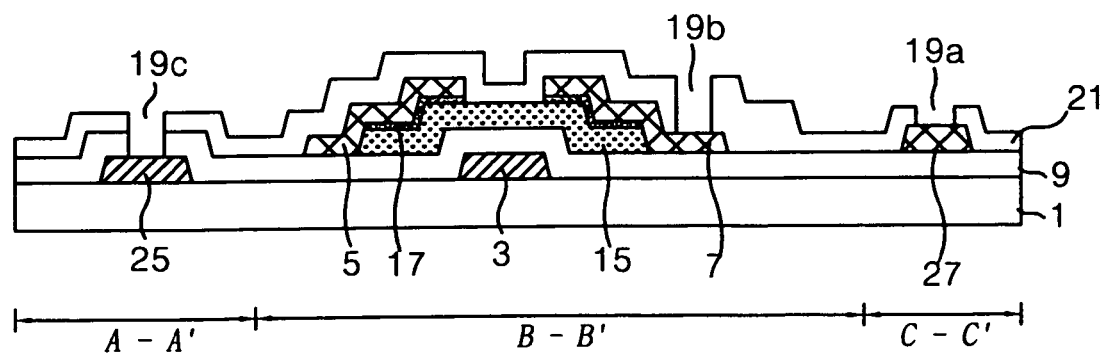
Figure 3E:
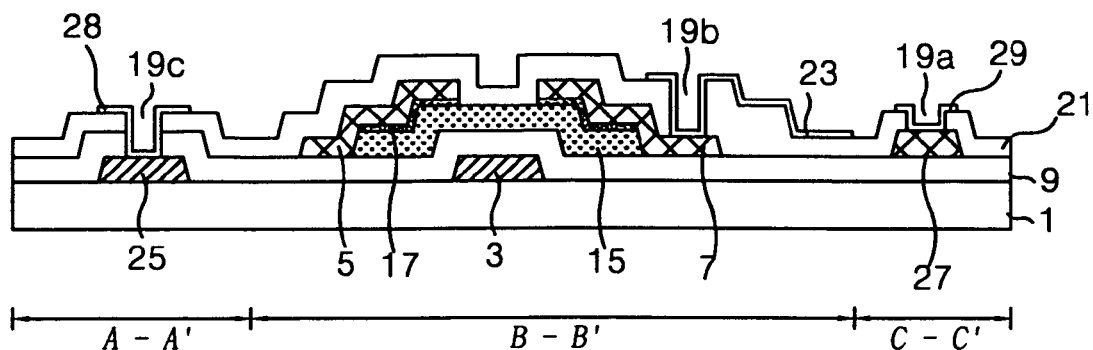
Figure 4:
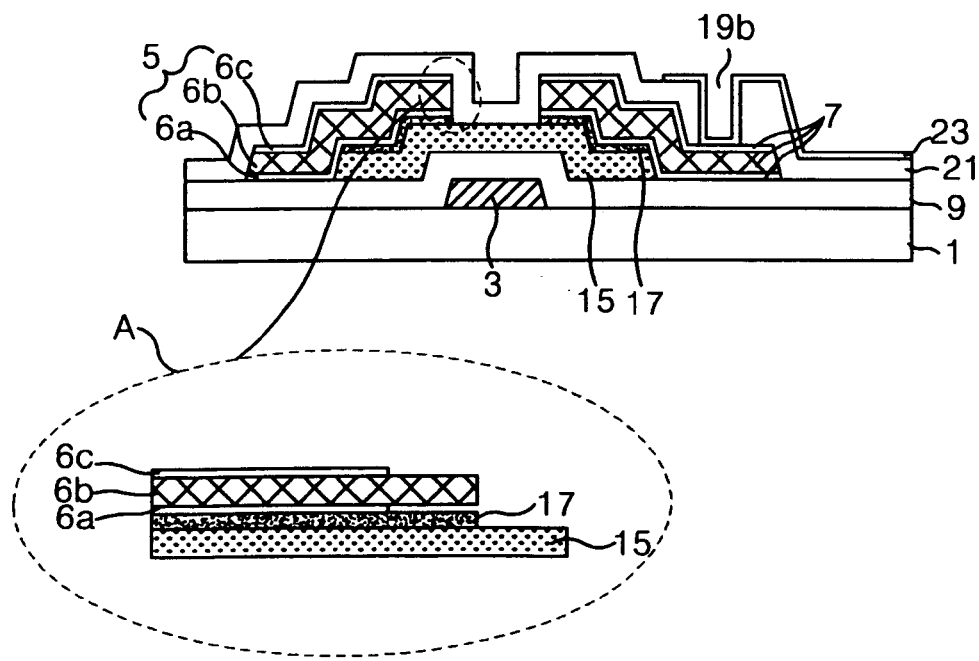
FIG. 4 is a section view showing an over-etching phenomenon of a conventional data metal layer having a three-layer structure.
Figure 5:
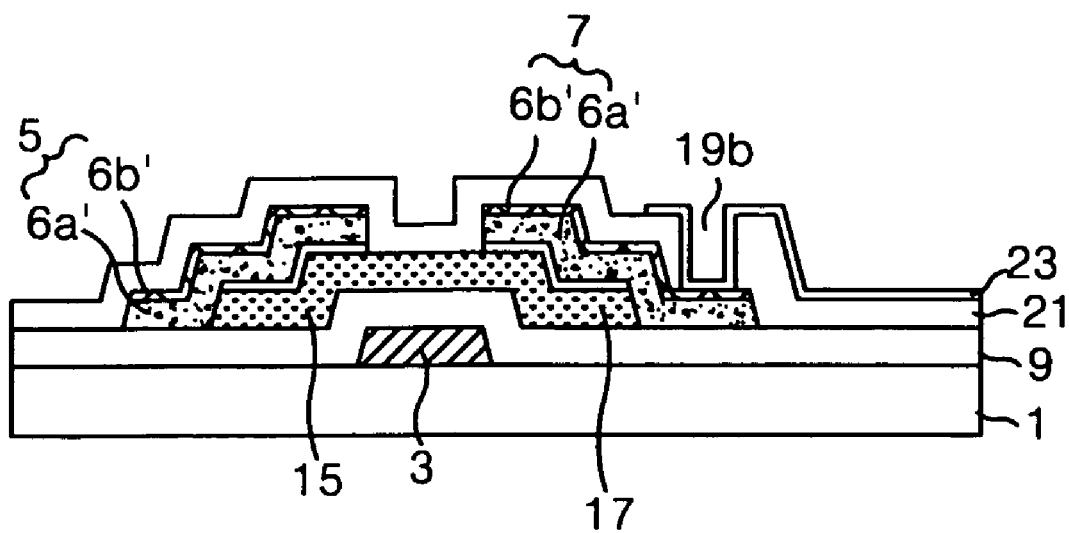
FIG. 5 is a section view showing a structure of a conventional data metal layer having a two-layer structure.
Figure 6:
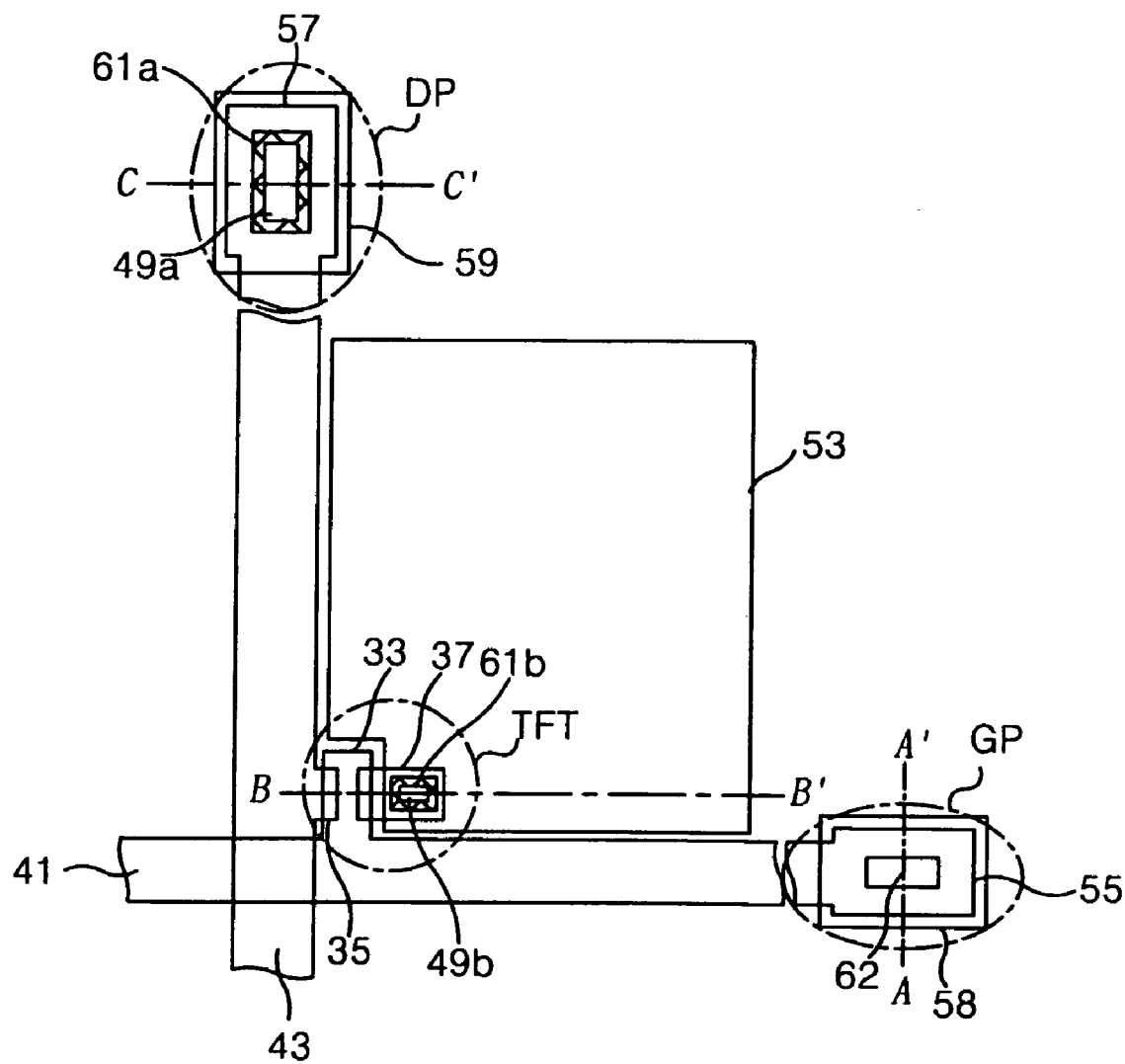
FIG. 6 is a plan view showing a structure of an array substrate of a liquid crystal display device according to a first embodiment of the present invention.
Figure 7:
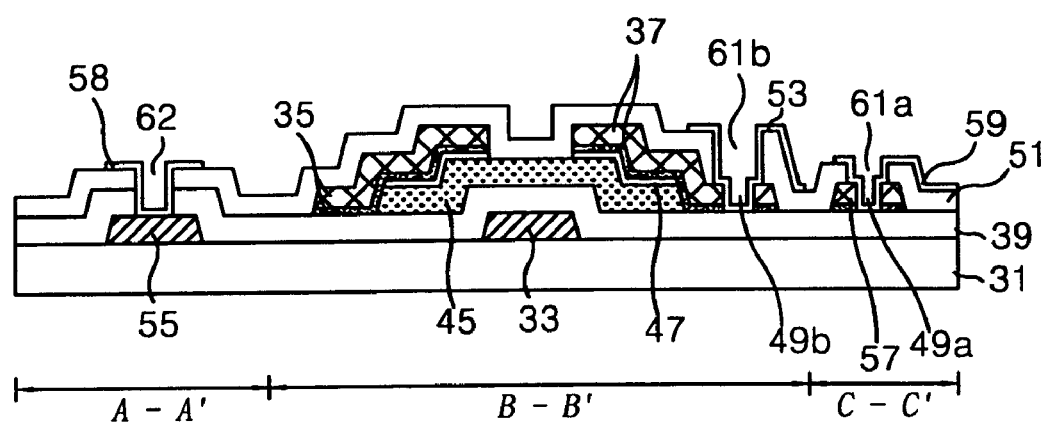
FIG. 7 is a section view of the array substrate of the liquid crystal display device taken along the lines A–A', B–B' and C–C' of FIG. 6.

FIGS. 6 and 7 illustrate a structure of an array substrate of a liquid crystal display device according to a first embodiment of the present invention. Referring to FIGS. 6 and 7, an array substrate 31 of a liquid crystal display (LCD) device according to a first embodiment of the present invention includes a thin film transistor (TFT) arranged at an intersection between a data line 43 and a gate line 41, a pixel electrode 53 connected to a drain electrode 37 of the TFT, a data pad portion DP connected to the data line 43, and a gate pad portion GP connected to the gate line 41.

The TFT includes a gate electrode 33 connected to the gate line 41, a source electrode 35 connected to the data line 43, and a drain electrode 37 connected, via first and second drain contact holes 49*b* and 61*b*, to the pixel electrode 53. The source electrode 35 and the drain electrode 37 have a two-layer structure made of first and second metal layers 36*a* and 36*b* (see FIG. 8C). The first metal layer 36*a* is preferably made of molybdenum (Mo), chrome (Cr), tungsten (W), titanium (Ti), or Tantalum (Ta), etc., for example, while the second metal layer 36*b* is preferably made of aluminum (Al) or an Al alloy, etc., for example.

Further, the TFT includes semiconductor layers 45 and 47. A channel is established in the semiconductor layer 45 between the source electrode 35 and the drain electrode 37 when a gate voltage is applied to the gate electrode 33. The TFT selectively applies a data signal from the data line 43 to the pixel electrode 53 in response to a gate signal from the gate line 41.

The pixel electrode 53 is positioned at a cell area divided by the data line 43 and the gate line 41, and is made from a transparent conductive material having a high light transmittance. The pixel electrode 53 electrically contacts the drain electrode 37 via the first and second drain contact holes 49b and 61b. The first drain contact hole 49b is formed simultaneously with patterning of the source electrode 35 and the drain electrode 37. The second drain contact hole 61b is formed upon patterning of a protective film 51, and overlaps the first drain contact hole 49b. The second drain contact hole 61b has a width larger than or substantially equal to that of the first drain contact hole 49b.

The pixel electrode 53 is applied with a data signal through the TFT, and generates a corresponding potential difference relative to a common transparent electrode provided on an upper substrate (not shown in the figure). By this potential difference, a liquid crystal positioned between the array substrate 1 and the upper substrate is rotated due to its dielectric anisotropy. This way, the liquid crystal allows light from a light source to transmit through the pixel electrode 53 towards the upper substrate.

The gate pad portion GP receives a scanning signal, i.g, a gate pulse, from a gate driving IC (not shown in the figure), and passes it to the gate line 41. The gate pad portion GP includes a gate pad 55, a gate insulating film 39 thereon, a protective film 51, and a gate pad terminal electrode 58. The gate pad terminal electrode 58 contacts the surface of the gate pad 55 via a gate contact hole 62 formed through the gate insulating film 39 and the protective film 51.

The data pad portion DP passes a data signal from a data driving IC (not shown in the figure) to the data line 43. The data pad portion DP includes a data pad 57, a protective film 51 thereon, and a data pad terminal electrode 59. The data pad terminal electrode 59 contacts the side surfaces of the data pad 57 via the first and second data contact holes 49a and 61a formed in the data pad 57 and the protective layer 51. The first data contact hole 49a is formed upon patterning of the data pad 57. The second data contact hole 61a is formed upon patterning of the protective film 51, and overlaps the first data contact hole 49a. The second data contact hole 61a has a width larger than or substantially equal to that of the first data contact hole 49a.

Figure 8A:
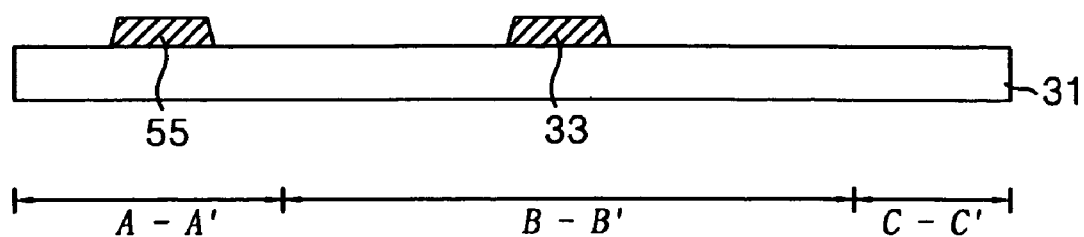
FIGS. 8A to 8E are section views illustrating a process of fabricating the array substrate of the liquid crystal display device of FIG. 7.

FIG. 8A to FIG. 8E are section views for illustrating a process of fabricating the array substrate of the liquid crystal display device of FIG. 7. Referring to FIG. 8A, the gate pad 55 and the gate electrode 33 are formed on the array substrate 31 of the LCD device. The gate pad 55 and the gate electrode 33 are formed by depositing aluminum (Al) or copper (Cu), for example, onto the array substrate 31 by a deposition technique, such as a sputtering, etc., and by patterning it using a mask.

Figure 8B:
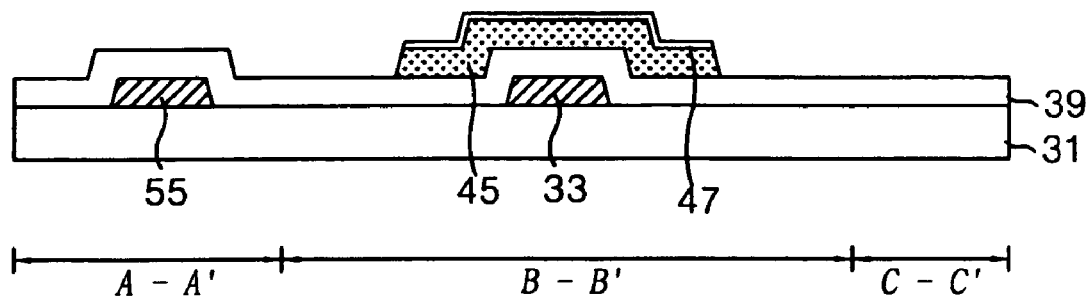

Referring to FIG. 8B, a gate insulating film 39 is formed on the entire surface of the array substrate 31 to cover the gate pad 55 and the gate electrode 33. Then, an active layer 45 and an ohmic contact layer 47 are formed over the gate insulating film 39. The active layer 45 and the ohmic contact layer 47 is formed by sequentially depositing first and second semiconductor materials on the gate insulating film 39 and by patterning them.

The gate insulating film 39 may be formed by depositing an insulating material, such as silicon nitride ($SiN_x$) or silicon oxide ($SiO_x$), for example, by the plasma enhanced chemical vapor deposition (PECVD), for example. The active layer 45 may be formed of amorphous silicon that is not doped with an impurity as the first semiconductor material. The ohmic contact layer 47 may be formed of amorphous silicon doped with an n-type or p-type impurity as the second semiconductor material.

Figure 8C:
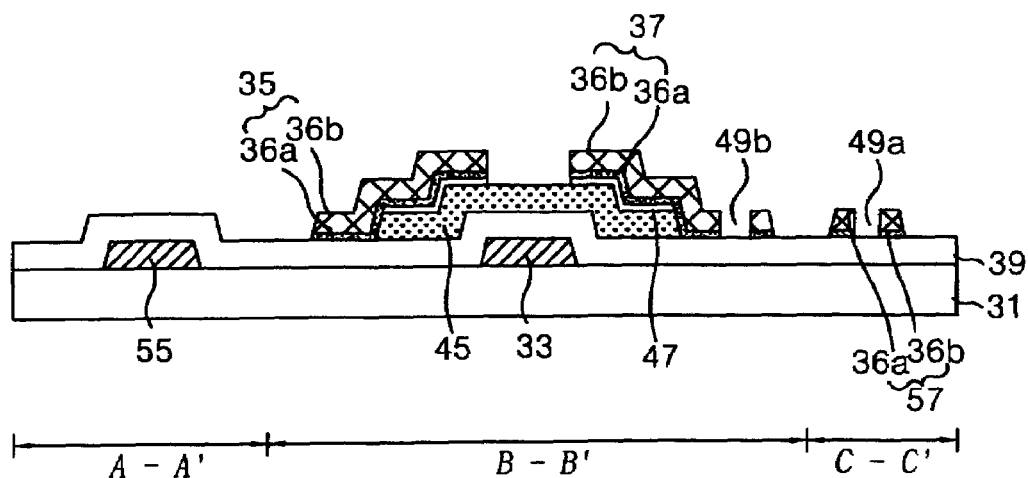

Referring to FIG. 8C, the data pad 57, the source electrode 35, and the drain electrode 37 are formed over the gate insulating film 39. The data pad 57, the source electrode 35, and the drain electrode 37 are formed by sequentially depositing first and second metal layers and by patterning them. At the same time, the first drain contact hole 49b penetrating the drain electrode 37 is formed to expose the underlying gate insulating film 39. Similarly, the first data contact hole 49a penetrating the data pad 57 is formed to expose the underlying gate insulating film 39. After the source electrode 35 and the drain electrode 37 are so patterned, a portion of the ohmic contact layer 47 corresponding to the gate electrode 33 is patterned to expose the active layer 45. The portion of the active layer 45 situated over the gate electrode 33 between the source electrode 35 and the drain electrode 37 corresponds to a channel.

The first metal layer 36a is preferably made of molybdenum (Mo), chrome (Cr), tungsten (W), titanium (Ti), or Tantalum (Ta), etc., for example, while the second metal layer 36b is preferably made of aluminum (Al) or an Al alloy, etc., for example.

Figure 8D:
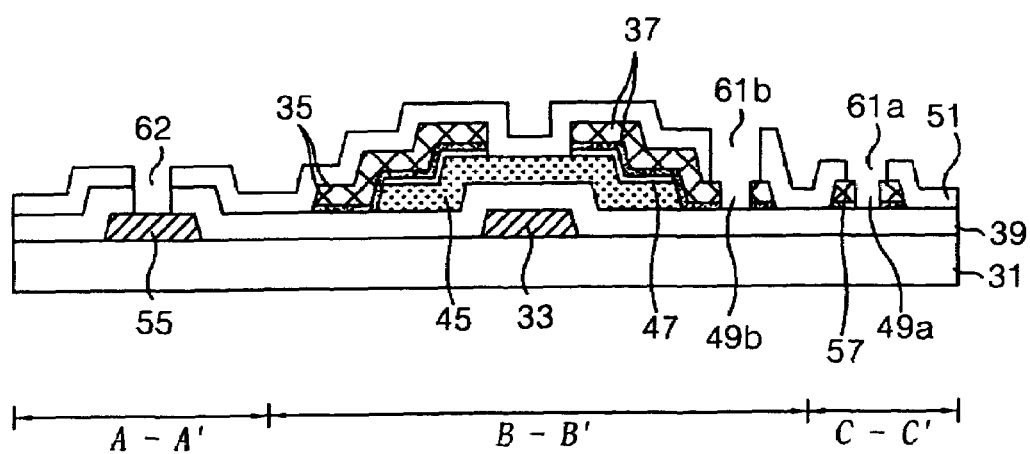

Referring to FIG. 8D, the protective layer 51 is formed over the gate insulating film 39. The protective layer 51 is formed by depositing an insulating material over the gate insulating film 39 and by patterning it to cover the data pad 57, the source electrode 35, and the drain electrode 37. The protective layer 51 is provided with the second drain contact hole 61b, the second data contact hole 61a, and the gate contact hole 62.

The second drain contact hole 61b and the second data contact hole 61a penetrate the protective film 51, and expose the gate insulating film 39 at the respective regions. The second data contact hole 61a overlaps the first data contact hole 49a while the second drain contact hole 61b overlaps the first drain contact hole 49b. The second drain contact hole 61b and the second data contact hole 61a have respective widths lager than or substantially equal to those of the first drain contact hole 49b and the first data contact hole 49a, respectively. The gate contact hole 62 exposes the gate pad 55 through the protective film 51 and the gate insulating film 39.

The protective film 51 is preferably made of an inorganic insulating material, such as silicon nitride ($SiN_x$) or silicon oxide ($SiO_x$), for example, or an organic insulating material, such as an acrylic organic compound, Teflon, BCB (benzocyclobutene), Cytop or PFCB (perfluorocyclobutane), for example.

Figure 8E:
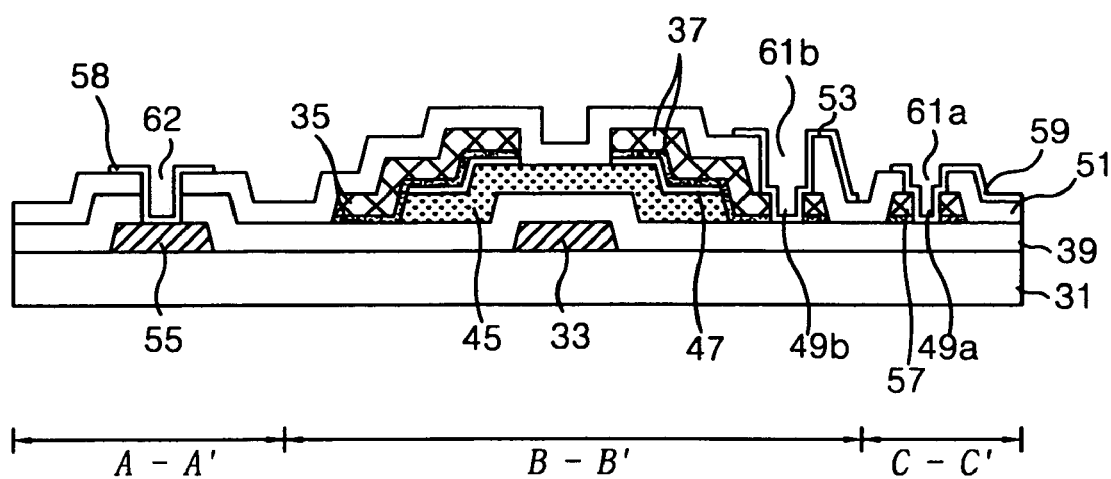

Referring to FIG. 8E, the pixel electrode 53, the gate pad terminal electrode 58, and the data pad terminal electrode 59 are formed on the protective layer 51. The pixel electrode 53, the gate pad terminal electrode 58, and the data pad terminal electrode 59 are formed by depositing a transparent conductive material on the protective film 51 and by patterning it into desired shapes.

The pixel electrode 53 electronically contacts the drain electrode 37 at the inner surfaces of the first drain contact hole 49b formed in the drain electrode 37 through the second drain contact hole 61b. The data pad terminal electrode 59 electronically contacts the data pad 57 at the inner surfaces of the first data contact hole 49a through the second data contact hole 61a. The gate pad terminal electrode 58 electrically contacts the gate pad 55 through the gate contact hole 62.

Each of the pixel electrode 53, the gate pad terminal electrode 59, and the data pad terminal electrode 58 is preferably made of any one of indium-tin-oxide (ITO), indium-zinc-oxide (IZO), and indium-tin-zinc-oxide (ITZO), for example.

SECOND EMBODIMENT

Figure 9:
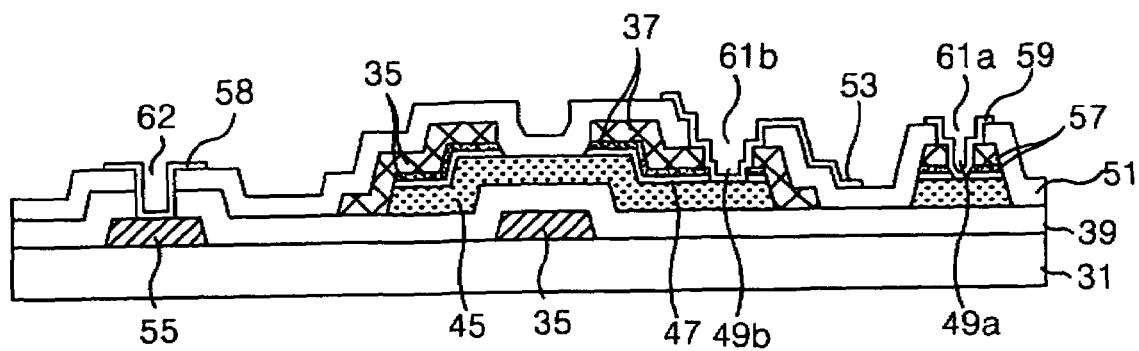
FIG. 9 is a plan view showing a structure of an array substrate of a liquid crystal display device according to a second embodiment of the present invention.

FIG. 9 is a section view showing a structure of an array substrate of a liquid crystal display device according to a second embodiment of the present invention. Referring to FIG. 9, an array substrate 31 of a liquid crystal display (LCD) device according to the second embodiment has elements similar to those of FIG. 7. Those like elements are assigned the same reference numerals.

The array substrate of this example additionally includes semiconductor layers 45 and 47 at a data pad region and the drain electrode-pixel electrode contact region. Moreover, the first metal layer 36a (FIG. 10B) and the semiconductor layers 45 and 47 at the data pad region are formed to have substantially the same pattern during the manufacturing process. Also, the first metal layer 36a constituting a part of source and drain electrodes 35 and 37 and the semiconductor layer 47 at the TFT region are formed to have substantially the same pattern during the manufacturing process.

Figure 10A:
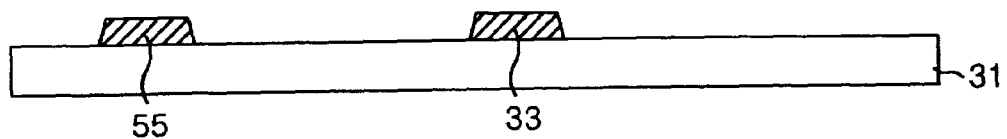
FIGS. 10A to 10E are section views illustrating a process of fabricating the array substrate of the liquid crystal display device of FIG. 9.
Figure 10B:
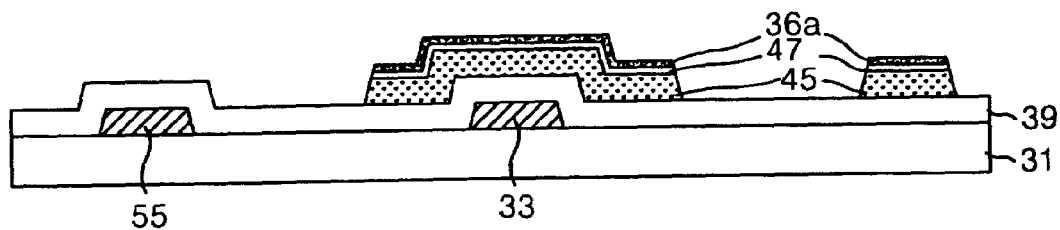

The source electrode 35 and the drain electrode 37 of the TFT are in part formed of a first metal layer (36a in FIG. 10B). The first metal layer 36a is patterned simultaneously with patterning of the underlying semiconductor layers 45 and 47, thereby having substantially the same pattern as the underlying semiconductor layers 45 and 47 at this stage. Subsequently, a second metal layer (36b in FIG. 10C) is deposited thereon and patterned. A first drain contact hole 49b is formed to penetrate the first and second metal layers and semiconductor layer 47. The second drain contact hole 61b is formed to penetrate the protective film 51 at the position of the first drain contact hole 49b. The second drain contact hole 61b has a width larger than or substantially equal to that of the first drain contact hole 49b. The drain electrode 37 electrically contacts the pixel electrode 53 at its side surfaces via the first and second drain contact holes 49b and 61b.

The data pad 57 is in part formed of the first metal layer 36a (FIG. 10B). The first metal layer 36a of the data pad 57 is formed simultaneously with the patterning of the underlying semiconductor layers 45 and 47, thereby having substantially the same pattern as the underlying semiconductor layers 45 and 47. Subsequently, the second metal layer 36b (FIG. 10C) is deposited thereon and patterned. A first data contact hole 49a penetrates the first and second metal layers and the semiconductor layer 47. The second data contact hole 61a penetrates the protective film 51 at the first data contact hole 49a, and has a width larger than or substantially equal to the first data contact hole 49a. The data pad 57 electrically contacts the data pad terminal electrode 59 at its side surfaces via the first and second data contact holes 49a and 61a.

FIGS. 10A to 10E are section views illustrating a process of fabricating the array substrate of the liquid crystal display device of FIG. 9. Referring to FIG. 10A, a gate pad 55 and a gate electrode 33 are formed on an array substrate 31 of the LCD device. The gate pad 55 and the gate electrode 33 are formed by depositing aluminum (Al) or copper (Cu), for example, on the array substrate 31 by a deposition technique, such as a sputtering, etc., for example, and by patterning it using a mask.

Referring to FIG. 10B, the gate insulating film 39 is formed on the entire surface of the array substrate 31 so as to cover the gate pad 55 and the gate electrode 33. Then, an active layer 45, an ohmic contact layer 47, and a first metal layer 36a are formed over the gate insulating film 39. The active layer 45 and the ohmic contact layer 47 are formed by sequentially depositing first and second semiconductor materials over the gate insulating film 39 and by patterning them. The active layer 45, the ohmic contact layer 47, and the first metal layer 36a are patterned simultaneously, and accordingly are formed into the same pattern. As compared with the case of the first embodiment above in which the metal layer is patterned after the active layer and the ohmic contact layer are patterned, the structure of this example improves a contact resistance between the ohmic contact layer 47 and the first metal layer 36a.

The gate insulating film 39 is preferably formed by depositing an insulating material, such as silicon nitride ($SiN_x$) or silicon oxide ($SiO_x$), for example, by the plasma enhanced chemical vapor deposition (PECVD), for example. The active layer 45 is preferably formed of amorphous silicon that is not doped with an impurity as the first semiconductor material. The ohmic contact layer 47 is preferably formed of amorphous silicon doped with an n-type or p-type impurity as the second semiconductor material. The first metal layer 36a is preferably made of Titanium (Ti), Tantalum (Ta), tungsten (W), chrome (Cr), or molybdenum (Mo), for example.

Figure 10C:
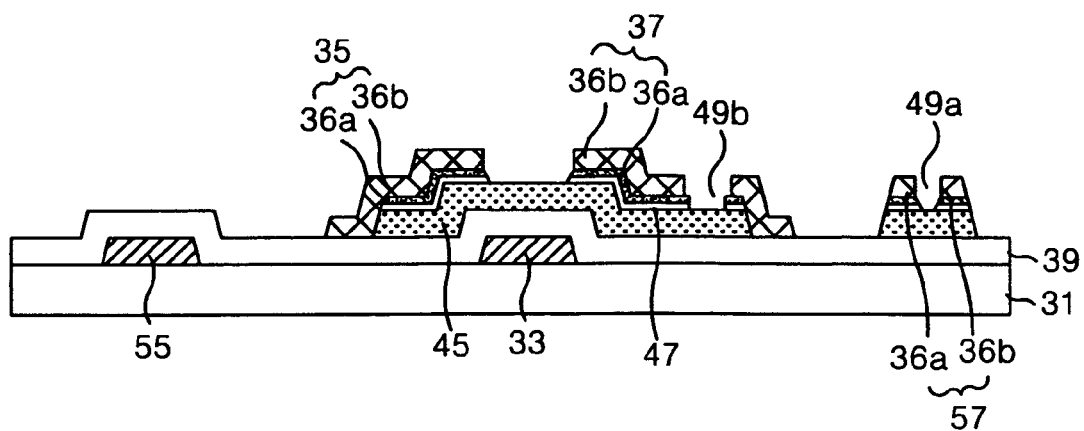

Referring to FIG. 10C, the data pad 57, the source electrode 35, and the drain electrode 37 are formed over the gate insulating film 39. The data pad 57, the source electrode 35, and the drain electrode 37 are preferably formed by depositing aluminum (Al) or an aluminum alloy as the second metal layer, for example, and by patterning it by the photolithography including a wet etching, for example. Thereafter, portions of the first metal layer 36a and the ohmic contact layer 47 corresponding to the gate electrode 33 are patterned to expose the active layer 45. A portion of the active layer 45 over the gate electrode 33 between the source electrode 35 and the drain electrode 37 corresponds to a channel. At the same time, the first metal layer 36a and the ohmic contact layer 47 at the drain electrode 37 are patterned to expose the underlying active layer 45, forming a first drain contact hole 49b. Also, the first metal layer 36a and the ohmic contact layer 47 at the data pad 57 are patterned to expose the underlying active layer 45, thereby forming a first data contact hole 49a.

Figure 10D:
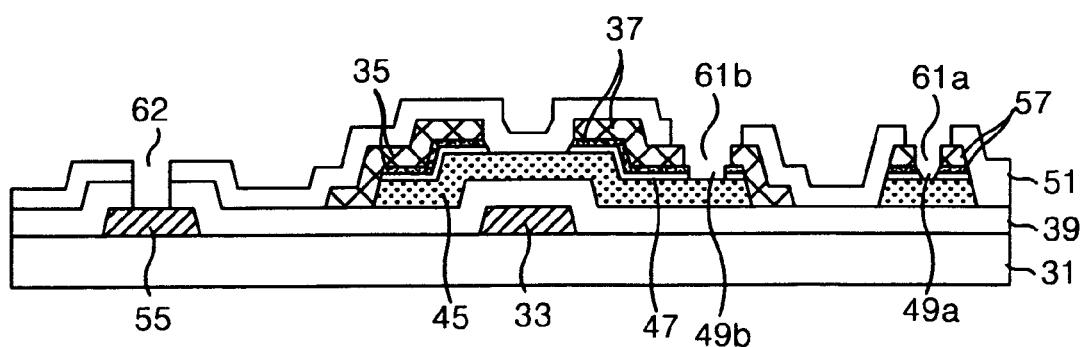

Referring to FIG. 10D, the protective layer 51 is formed over the gate insulating film 39. The protective layer 51 is formed by depositing an insulating material over the gate insulating film 39 and by patterning it so as to cover the data pad 57, the source electrode 35, and the drain electrode 37. The protective layer 51 is provided with the second drain contact hole 61b, the second data contact hole 61a, and the gate contact hole 62.

The second drain contact hole 61b and the second data contact hole 61a penetrate the protective film 51, and expose the semiconductor layer 45 at the respective regions. The second data contact hole 61a overlaps the first data contact hole 49a while the second drain contact hole 61b overlaps the first drain contact hole 49b. The second drain contact hole 61b and the second data contact hole 61a have respective widths lager than or substantially equal to those of the first drain contact hole 49*b* and the first data contact hole 49*a*, respectively. The gate contact hole 62 exposes the gate pad 55 through the protective film 51 and the gate insulating film 39.

The protective film 51 is preferably made of an inorganic insulating material, such as silicon nitride ($SiN_x$) or silicon oxide ($SiO_x$), for example, or an organic insulating material, such as an acrylic organic compound, Teflon, BCB (benzocyclobutene), Cytop or PFCB (perfluorocyclobutane), for example.

Figure 10E:
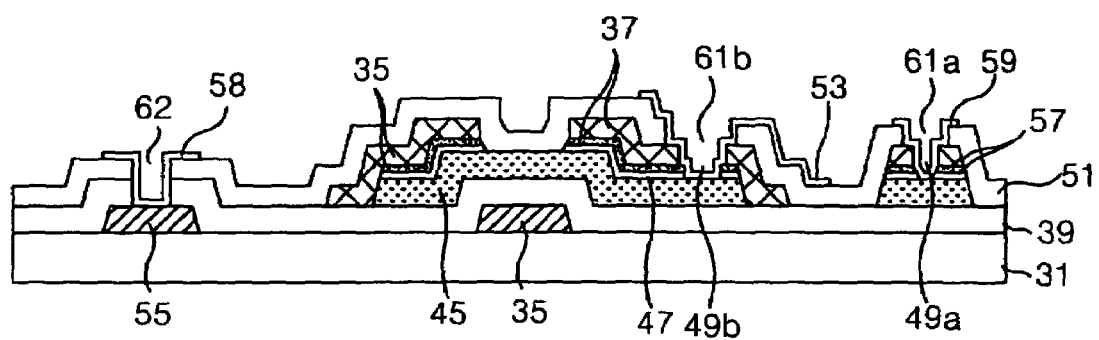

Referring to FIG. 10E, the pixel electrode 53, the gate pad terminal electrode 58, and the data pad terminal electrode 59 are formed on the protective layer 51. The pixel electrode 53, the gate pad terminal electrode 58, and the data pad terminal electrode 59 are formed by depositing a transparent conductive material on the protective film 51 and by patterning it into desired shapes.

The pixel electrode 53 electronically contacts the drain electrode 37 at the inner surfaces of the first drain contact hole 49*b* through the second drain contact holes 61*b*, whereas the data pad terminal electrode 59 electronically contacts the data pad 57 at the inner surfaces of the first data contact hole 49*a* through the second data contact hole 61*a*. The gate pad terminal electrode 58 electrically contacts the gate pad 55 through the gate contact hole 62.

Each of the pixel electrode 53, the gate pad terminal electrode 59, and the data pad terminal electrode 58 is preferably made of any one of ITO, IZO, and ITZO, for example.

As described above, according to the present invention, the first drain contact hole and first data pad contact hole respectively penetrate the drain electrode and the data pad each having a two-layer structure. The second drain contact hole and the second data contact hole penetrate the protective layer at the positions of the first drain contact hole and the first data contact hole, respectively. Accordingly, the metal at the uppermost layer of the drain electrode is put in good contract with the pixel electrode at its side surfaces, thereby reducing the contact resistance. Similarly, the metal at the uppermost layer of the data pad is put in good contact with the data pad terminal electrode at its side surfaces, thereby reducing the contact resistance.

Moreover, in the second embodiment above, the first metal layer of the two-layer metal layer is formed simultaneously with patterning of the underlying semiconductor layers, and accordingly has substantially the same pattern as the underlying semiconductor layer during the manufacturing process. Accordingly, the contact resistance between the semiconductor layer and the first metal layer can be significantly reduced. As a result, it becomes possible to improve the quality and the throughput of the resulting LCD devices.

It will be apparent to those skilled in the art that various modifications and variations can be made in the array substrate of a liquid crystal display and the fabricating method thereof of the present invention without departing from the spirit or scope of the invention. Thus, it is intended that present invention cover the modifications and variations of this invention provided they come within the scope of the appended claims and their equivalents.

In the claims:

1. A method of fabricating an array substrate for a liquid crystal display device, comprising the steps of:
   forming a gate electrode and a gate line over a substrate;
   forming a gate insulating film over the substrate;
   forming a semiconductor layer over the gate insulating film;
   forming a data line, a source electrode, and a drain electrode over the gate insulating film, each of the data line, the source electrode, and the drain electrode including, at least in part, two layers of conductive materials, the step including removing portions of at least one of the two layers to pattern the drain electrode and, at the same time, define a first drain contact hole penetrating the two layers;
   forming a protective layer over the gate insulating film, the data line, the source electrode, and the drain electrode, the protective layer having a second drain contact hole communicating with the first drain contact hole; and
   forming a pixel electrode over the protective layer, the pixel electrode contacting the drain electrode at inner surfaces of the first drain contact hole formed in the drain electrode through the second drain contact hole.

2. The method according to claim 1, wherein the width of the second drain contact hole is lager than or substantially equal to that of the first drain contact hole.

3. The method according to claim 1, wherein said two layers of conductive materials are a first metal layer and a second metal layer on the first metal layer, the first metal layer being one of molybdenum (Mo), chrome (Cr), tantalum (Ta), tungsten (W), and titanium (Ti), and the second metal layer being aluminum (Al) or an aluminum alloy.

4. The method according to claim 1, wherein the step of forming the semiconductor layer includes the steps of:
   forming an active layer overlapping the gate electrode over the gate insulating film; and
   forming an ohmic contact layer on a part of the active layer,
      wherein said two layers of conductive materials are a first metal layer and a second metal layer on the first metal layer, and
      wherein the first metal layer of said two layers of the drain electrode and the ohmic contact layer thereunder have substantially the same pattern.

5. The method according to claim 1, further comprising the steps of:
   forming a data pad at one end of the data line, the data pad including, at least in part, said two layers of conductive materials, the step including removing portions of at least one of the two layers to pattern the data pad and, at the same time, define a first data contact hole penetrating the two layers, the data pad being situated below the protective layer;
   removing a portion of the protective layer to define a second data contact hole communicating with the first data contact hole; and
   forming a data pad terminal electrode over the protective layer, the data pad terminal electrode being in contact with the data pad at inner surfaces of the first data contact hole formed in the data pad through the second data contact hole.

6. The method according to claim 5, wherein the width of the second data contact hole is lager than or substantially equal to that of the first data contact hole.

7. The method according to claim 5, wherein said two layers of conductive materials are a first metal layer and a second metal layer on the first metal layer, the first metal layer being one of molybdenum (Mo), chrome (Cr), tantalum (Ta), tungsten (W), and titanium (Ti), and the second metal layer being aluminum (Al) or an aluminum alloy.

8. The method according to claim 5, wherein the data pad is formed over the gate insulating film.

9. The method according to claim 8, wherein said two layers are a first metal layer and a second metal layer on the first metal layer, and
wherein the data pad further includes a semiconductor layer beneath the first metal layer.

10. The method according to claim 9, wherein the first metal layer of the two layers of the data pad and the underlying semiconductor layer have substantially the same pattern.

* * * * *